(12) United States Patent
Jain et al.

(10) Patent No.: US 11,397,764 B2
(45) Date of Patent: Jul. 26, 2022

(54) MACHINE LEARNING FOR DIGITAL IMAGE SELECTION ACROSS OBJECT VARIATIONS

(71) Applicant: Adobe Inc., San Jose, CA (US)

(72) Inventors: Ajay Jain, Ghaziabad (IN); Sanjeev Tagra, Panipat (IN); Sachin Soni, New Delhi (IN); Ryan Timothy Rozich, Austin, TX (US); Nikaash Puri, New Delhi (IN); Jonathan Stephen Roeder, Round Rock, TX (US)

(73) Assignee: Adobe Inc., San Jose, CA (US)

( * ) Notice: Subject to any disclaimer, the term of this patent is extended or adjusted under 35 U.S.C. 154(b) by 340 days.

(21) Appl. No.: 16/774,681

(22) Filed: Jan. 28, 2020

(65) Prior Publication Data

US 2021/0232621 A1 Jul. 29, 2021

(51) Int. Cl.
*G06F 16/535* (2019.01)
*G06F 16/583* (2019.01)
(Continued)

(52) U.S. Cl.
CPC .......... *G06F 16/535* (2019.01); *G06F 16/583* (2019.01); *G06F 16/9535* (2019.01); *G06K 9/6215* (2013.01); *G06K 9/6256* (2013.01); *G06K 9/6267* (2013.01); *G06N 3/0454* (2013.01); *G06N 3/0472* (2013.01); *G06N 3/08* (2013.01); *G06N 20/00* (2019.01); *G06Q 30/0254* (2013.01); *G06Q 30/0255* (2013.01); *G06Q 30/0261* (2013.01);
(Continued)

(58) Field of Classification Search
CPC ............... G06F 16/535; G06F 16/9535; G06F 16/9577; G06K 9/6256; G06K 9/6215; G06N 3/0472; G06N 20/00; G06N 3/0454; G06N 3/08; G06V 2201/10; G06Q 30/0254; G06Q 30/0255; G06Q 30/0261; G06Q 30/0269; G06Q 30/0621; G06Q 30/0641
See application file for complete search history.

(56) References Cited

U.S. PATENT DOCUMENTS

| 10,909,459 B2 * | 2/2021 | Tsatsin ................. G06N 3/0454 |
| 2018/0157499 A1 * | 6/2018 | Lee ......................... G06F 9/451 |
| 2019/0251446 A1 | 8/2019 | Fang et al. |

OTHER PUBLICATIONS

"Foreign Office Action", AU Application No. 2020273315, dated Jul. 9, 201, 10 pages.
(Continued)

*Primary Examiner* — Asghar H Bilgrami
(74) *Attorney, Agent, or Firm* — FIG. 1 Patents

(57) ABSTRACT

Digital image selection techniques are described that employ machine learning to select a digital image of an object from a plurality of digital images of the object. The plurality of digital images each capture the object for inclusion as part of generating digital content, e.g., a webpage, a thumbnail to represent a digital video, and so on. In one example, digital image selection techniques are described that employ machine learning to select a digital image of an object from a plurality of digital images of the object. As a result, the service provider system may select a digital image of an object from a plurality of digital images of the object that has an increased likelihood of achieving a desired outcome and may address the multitude of different ways in which an object may be presented to a user.

16 Claims, 8 Drawing Sheets

(51) Int. Cl.
*G06K 9/62* (2022.01)
*G06N 3/04* (2006.01)
*G06N 20/00* (2019.01)
*G06N 3/08* (2006.01)
*G06F 16/9535* (2019.01)
*G06F 16/957* (2019.01)
*G06Q 30/02* (2012.01)
*G06Q 30/06* (2012.01)

(52) U.S. Cl.
CPC ..... *G06Q 30/0269* (2013.01); *G06Q 30/0621* (2013.01); *G06Q 30/0641* (2013.01); *G06F 16/9577* (2019.01); *G06V 2201/10* (2022.01)

(56) References Cited

OTHER PUBLICATIONS

"Foreign Office Action", AU Application No. 2020273315, dated Jun. 30, 2021, 7 pages.
Kang, Wang-Cheng et al., "Visually-Aware Fashion Recommendation and Design with Generative Image Models", Cornell University, arXiv Preprint, arXiv.org [online][retrieved Jul. 21, 2021], Retrieved from the Internet <https://arxiv.org/pdf/1711.02231>., Nov. 7, 2017, 10 pages.
"Foreign Office Action", GB Application No. 2018709.2, dated Apr. 13, 2021, 9 pages.
"Foreign Office Action", GB Application No. 2018709.2, dated Mar. 14, 2022, 8 pages.

* cited by examiner

MACHINE LEARNING FOR DIGITAL IMAGE SELECTION ACROSS OBJECT VARIATIONS

BACKGROUND

How an object is depicted in a digital image is one of the primary ways to drive user interest regarding that object. Digital images, for instance, may be configured to follow popular stylistic trends, themes of popular TV shows, and so forth. In such instances characteristics of the object itself may remain the same (e.g., colors, shapes), but how that object is depicted in the different digital images is changed. Consequently, one challenge of a service provider system in determining a possible digital image of interest involves how that object is depicted in the digital image.

This challenge is exacerbated in that user preferences may vary greatly between preferences in how the object is depicted. In practice, it has been shown that each user has their own choices and affinity regarding how the object is depicted. A first user, for instance, may have preferences involving a favorite TV show (e.g., to show the object in a mid-century modern setting) whereas a second user may prefer to view the object in a neutral setting, e.g., on a white background for clarity in color of the object. Thus, it would be difficult if not impossible for a human to determine which preferences are associated with each user, especially when confronted with potential millions of users that may access digital content having the digital image, e.g., webpages as served in real time. Conventional service provider systems are also unable to address how the object is depicted in the digital image. This is because conventional techniques rely on an identifier of the digital image as a whole and thus are not able to address actual visual characteristics of the object as depicted nor how those characteristics relate to other digital images. Consequently, conventional service provider systems may be inaccurate and result in inefficient use of computational and hardware resources in order to recommend a digital image of interest.

SUMMARY

Digital image selection techniques are described that employ machine learning to select a digital image of an object from a plurality of digital images involving variations in how the object is depicted. The plurality of digital images, for instance, may capture an object but are different in how the object is depicted in the digital images, e.g., different models wearing the same article of clothing, backgrounds, and so forth. The digital image is then selected for inclusion in digital content to increase a likelihood of an outcome, e.g., conversion of a good or service depicted by the object, by addressing user preferences involving these variations.

In one example, digital image selection techniques are described that employ machine learning to select a digital image of an object from a plurality of digital images involving variations of the object. To begin, a user ID is received by a service provider system as part of a request to obtain digital content, e.g., a webpage. A user profile is then obtained by the service provider system based on the user ID. The service provider system also selects a digital image from a plurality of digital images having variations of the object for inclusion as part of the digital content.

To do so, image metadata including features extracted from the digital images (e.g., using a convolutional neural network) are utilized along with the user profile to generate a prediction score for each of the plurality of digital images having the variations. The digital image indicated as having a greatest likelihood of resulting in a desired outcome (e.g., conversion) is then selected by the system for inclusion as part of the digital content, e.g., a webpage. As a result, the service provider system may select a digital image of an object from a plurality of digital images of the object that has an increased likelihood of achieving a desired outcome and may address the multitude of different ways in which an object may be presented to a user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
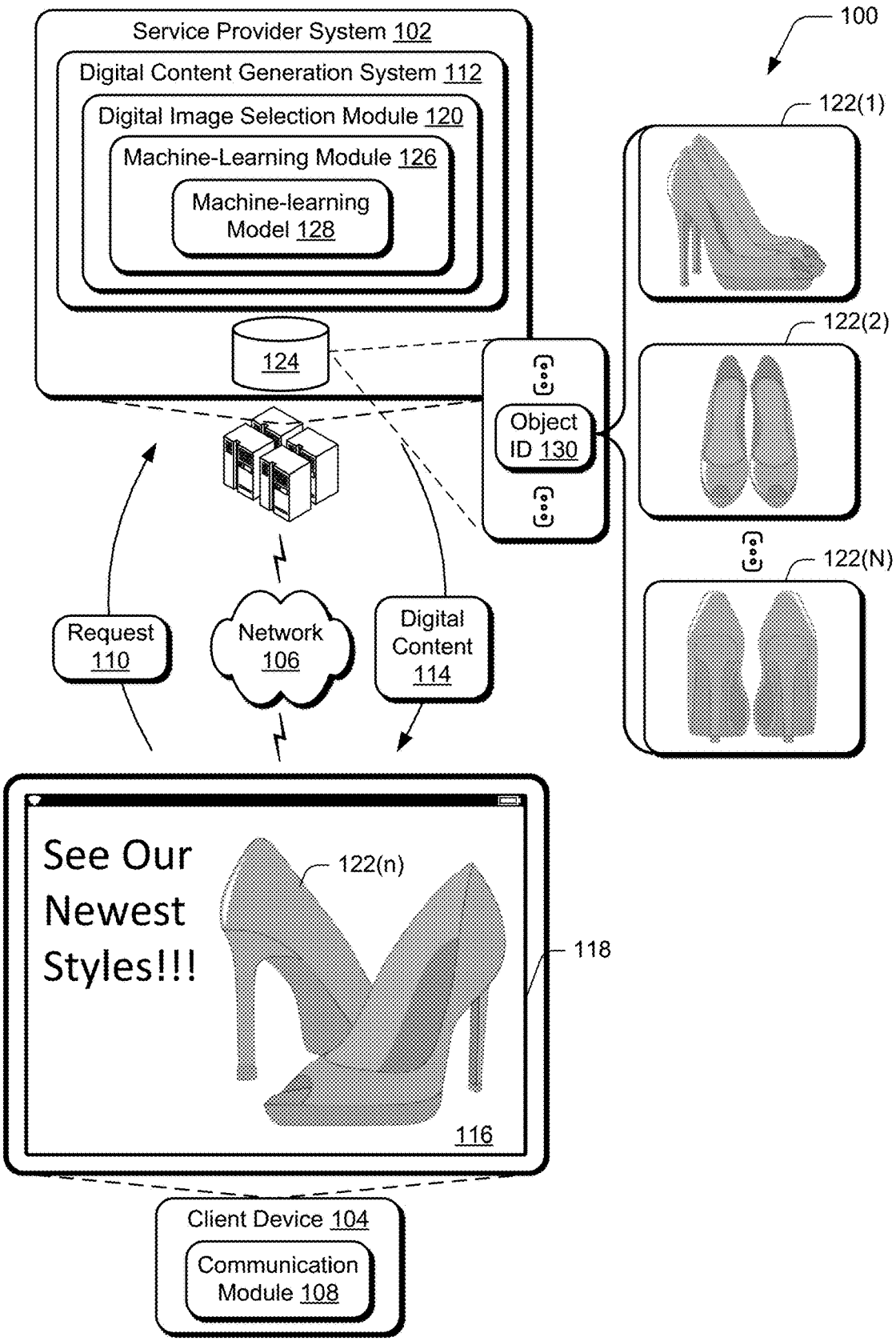
FIG. 1 is an illustration of an environment in an example implementation that is operable to employ machine learning digital image selection techniques described herein.

In has been observed that in real world scenarios each user has different affinities with different aspects involving variations in how an object is depicted in a digital image, even in instances in which visual characteristics of the object itself remain unchanged. Conventional techniques and systems that are used to select digital images for inclusion as part of digital content, however, do not address these variations, e.g., a particular view of the object to be included in a webpage, a thumbnail to be used to represent a digital video, models used to wear an item of clothing, and so forth. Rather, conventional techniques rely on a one-size-fits-all approach when addressing a particular object. Further, conventional techniques typically train a dedicated machine-learning model for each digital image, and thus are not able to leverage visual similarity with other digital images and encounter a "cold start" problem as further described below. Consequently, this may result in inefficient use of computational and network resources used to provide and receive digital content that includes these digital images, e.g., webpages, network-enabled applications, and so forth.

Accordingly, digital image selection techniques are described that employ machine learning to select a digital image of an object from a plurality of digital images of the object. The plurality of digital images each capture the object for inclusion as part of generating digital content, e.g., a webpage, a thumbnail to represent a digital video, and so on. However, the plurality of digital images include variations in how that object is depicted, preferences of which may vary from user to user. In one example, a user ID is received by a service provider system as part of a request to obtain digital content, e.g., a webpage. A user profile is then obtained by the service provider system based on the user ID. The user profile, for instance, may describe user interaction with items of digital content, digital images, user demographics, locations at which digital content requests originated, and so forth.

The service provider system then selects a digital image from a plurality of digital images of the object for inclusion as part of the digital content. The plurality of digital images, for instance, may be located based on an object ID associated with the requested digital content. The plurality of digital images in this example each capture an object of interest that is to be represented in the digital content, but have differences in at least one visual characteristic that support variations in how the object is depicted. The object, for instance, may be an item of clothing in a particular color, but is worn by different human models. Other examples of variations are also contemplated, including background characteristics of a scene in which the object is captured, different angles, arrangements, orientations, lighting, and so forth.

In one example of digital image selection, the service provider system determines whether to explore or exploit user behavior associated with the user ID in response to the request as part of selecting the digital image. A determination to explore the user behavior involves selecting digital images in order to learn more about the user behavior regarding the object depicted in the digital images, i.e., the user preferences regarding different depictions of the object. A determination to exploit the user behavior, on the other hand, is made in order to maximize a likelihood of achieving a desired outcome when exposed to the object via the digital image, e.g., to recommend an item of interest, conversion, and so forth.

Therefore, when a determination is made to explore user behavior, the service provider system randomly selects the digital image from a plurality of digital images having the object. When a determination is made to exploit the user behavior, the service provider system selects the digital image from the plurality of digital images based on the user profile using a machine-learning model, e.g., a neural network. Training data is then generated in either instance based on the user's interaction with the selected digital image to train and/or update training of the machine-learning model, e.g., to capture current trends.

The training data, for instance, may be formed as a plurality of interaction events, at least a portion of which correspond to requests made for the digital content. Each interaction event may include the user ID the originated the request, the user profile associated with the user ID, an image ID of a digital image selected in response to the request, image metadata associated with the digital image, and output data that describes an outcome of exposure of the digital image as part of the digital content. The outcome, for instance, may describe conversion such as whether the digital image was selected (e.g., as a thumbnail to initiate a digital video), resulted in purchase of a corresponding good or service that corresponds to the object depicted in the digital image, and so forth.

The image metadata used as part of the training data and/or to select a digital image for a subsequent request may support increased functionality over conventional techniques. In a conventional system, image IDs are used, solely, to identify correspondence between a digital image, a user ID, and a resulting outcome because a single model is trained for each image. Accordingly, the image ID does not describe visual characteristics and variations of those visual characteristics that are directly extracted from the digital image, and as such cannot support a determination of similarity between one digital image with another. Conventional techniques therefore suffer from a "cold start" problem and predictions regarding the digital image are not sufficiently accurate until a sufficient amount of training data is received (typically over a number of weeks). This is resource and computationally intensive in order to collect this data and results in user frustration from inaccurate predictions.

In the techniques described herein, however, the image metadata used to train the machine-learning model leverages image features extracted from the corresponding digital image, e.g., as a vector generated through feature extraction using a neural network. In this way, the image metadata describes what is visually contained within the digital image and may do so with increased accuracy over other techniques, such as image tagging that relies on a user's ability to express and manually tag what is contained in a digital image. By mapping features extracted from the digital image to a feature space through use of the machine-learning model, visual similarity of the digital image to other digital images may be determined and used to avoid the cold start problem of conventional techniques and address variations in object depiction. This acts to improve operation and accuracy of computing devices that implement these techniques.

In order to map the features and user profiles to the feature space, a machine-learning model is trained and updated using the user profile and image metadata included in respective interaction events in the training data, e.g., the image features extracted from the digital images using a neural network. The service provider system, for instance, may process the user profile and image metadata as part of a machine learning along with a loss function using the corresponding outcome data. In this way, a single machine-learning model is trained to generate a prediction score for each combination of subsequent user profile and image data extracted from corresponding digital images of the object. This overcomes the limitations of conventional techniques in which a dedicated machine-learning model is generated for each digital image, alone, and therefore similarity of digital images to each other is not supported and thus suffers from cold start problems as previously described.

Continuing with the example above, in order to select a digital image of an object from a plurality of digital images of the object responsive to an exploitation determination, the service provider system generates a prediction score for each digital image (e.g., fetched based on the object ID) using the associated image metadata and user profile corresponding to the user ID associated with the request. The digital image indicated as having a greatest likelihood of resulting in a desired outcome (e.g., conversion) is then selected by the system for inclusion as part of the digital content, e.g., a webpage.

The digital image (whether selected randomly as part of exploration or based on the machine-learning model as part of exploitation) is then used by the service provider system to generate the digital content (e.g., a webpage), which is communicated back to an originator of the request. As a result, the service provider system may select a digital image of an object from a plurality of digital images of the object that has an increased likelihood of achieving a desired outcome and may address the multitude of different ways in which an object may be presented to a user. This is not possible to be performed by a human alone due to the multitude of differences in user affinity with different visual characteristics that are not detectable by a human being. Further discussion of these and other examples is included in the following sections and shown in corresponding figures.

Term Examples

"Digital content" includes any type of data capable of being rendered by a computing device. Examples of digital content include webpages, digital videos, digital media, digital audio, digital images, user interfaces, and so forth.

A "neural network" typically includes a series of layers modeled as having nodes (i.e., neurons) and connections between the neurons that process data to achieve an output, such as classification of an input as exhibiting or not exhibiting a particular characteristic. One example of a neural network is a convolutional neural network.

A "loss function" is a function that maps values of one or more explanatory variables (e.g., features) into a real number representing a cost associated with an event, and in optimization the loss function is minimized in order to train a machine-learning model. In classification, for instance, the loss function is a penalty for incorrect classification, e.g., whether the outcome described in the output data did or did not occur.

"Exploration/exploitation" is utilized to determine whether to explore or exploit user behavior. A determination to explore the user behavior involves selecting digital images in order to learn more about the user behavior regarding the object depicted in the digital images, e.g., user preferences in how the object is depicted. A determination to exploit the user behavior, on the other hand, is made in order to maximize a likelihood of achieving a desired outcome when exposed to the object via the digital image, e.g., to recommend an item of interest, conversion, and so forth.

"Conversion" may correspond to a variety of actions. Example of such actions include whether interaction occurred with the digital image (e.g., a hover or "click"), whether a corresponding product (e.g., the object) or service was added to a shopping cart, whether the corresponding produce or service is purchased, selection of a thumbnail to launch a digital video or digital audio, and so forth.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ machine learning and digital image selection techniques described herein that support variations in how an object is depicted within the digital images. The illustrated environment 100 includes a service provider system 102 and a client device 104 that are communicatively coupled via a network 106, e.g., the Internet. Computing devices that implement the service provider system 102 and client device 104 may be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown and described in some instances, a computing device may be representative of a plurality of different devices, such as multiple servers utilized by a business to perform operations "over the cloud" as described in FIG. 8.

The client device 104 includes a communication module 108 (e.g., a web browser, network enabled application, and so on) that is configured to form a request 110 for communication via the network 106 to a digital content generation system 112. In response, the digital content generation system 112 generates digital content 114 for communication to and rendering in a user interface 116 by a display device 118 of the client device 104. The digital content 114 may be configured in a variety of ways, such as a webpage, user interface screen, digital video, and so forth.

As part of generating the digital content 114, the digital content generation system employs a digital image selection module 120 to select a digital image for inclusion as part of the digital content 114. The digital image 122(n), for instance, may be selected from a plurality of digital images 122(1), 122(2), . . . , 122(N) stored by a storage device 124, each of which depict an object but have visual differences in how that object is depicted.

In the illustrated example, the digital images 122(1)-122(N) each include a pair of shoes, but are captured from different viewpoints, have different arrangements, and so on. Thus, in this example the visual characteristics of the object itself remain the same (e.g., color), but how that object is depicted differs. Other examples are also contemplated, such as a difference in a background of the digital images, differences in the object itself, human models that are shown with the object, and so forth. Although the digital image selection module 120 is illustrated as implemented at the service provider system 102, functionality of the digital image selection module 120 may also be implemented in whole or in part locally at the client device 104.

In order to select the digital image, the digital image selection module 120 employs a machine-learning module 126 implementing a machine-learning model 128 to select the digital image that is most likely to achieve a desired outcome. The outcome, for instance, may include conversion, such as whether a corresponding good or service associated with the object depicted in the digital image is purchased, whether the digital image is selected (i.e., "clicked," used to initiate output of the corresponding digital content in a digital video scenario), and so forth.

The digital image selection module 120, for instance, may receive the request 110 for digital content 114 and obtain digital images 122(1)-122(N) associated with an object ID 130 associated with the digital content 114. The machine-learning model 128 then calculates a probability score. The probability score is computed for each of the plurality of digital images 122(1)-122(N) based on visual characteristics of the digital images and a user profile associated with a user ID received as part of the request. The probability score indicates a probability of achieving the desired outcome.

In order to determine which visual characteristics are included in respective digital images, image features are extracted from corresponding digital images. The image features, for instance, may be extracted using an embedding layer of a neural network (e.g., a convolutional neural network) to map the digital images to a lower dimensional embedding space. In this way, a single machine-learning model 128 may be used for a plurality of different digital images and as such address visual similarity of these digital images to each other. This is not possible in conventional techniques that employ a single dedicated model for each digital image.

As a result, the techniques described herein overcome challenges of conventional techniques and improve operation of a computing device that implements these techniques. A first such example is referred to as a counterfactual problem. Suppose data is received that indicates user selection of a digital image (e.g., conversion), this data does not indicate how user interaction would occur with other digital images. To avoid this problem, conventional techniques use separate dedicated machine-learning models for each digital image. The problem with such an approach is that, since each digital image is associated with a single machine-learning model, it is not possible to learn patterns across digital images. This adversely impacts the accuracy of the machine-learning model and thus operation of a corresponding computing device.

In the techniques described herein, however, a system is described that is configured to address the plurality of digital images of an object using a single machine-learning model. As part of this, image features are extracted from corresponding digital images using an embedding layer of a neural network to map the images to a lower dimensional space as a vector. In this way, closeness of the vectors within the embedding space is a measure of visual similarity of these digital images to each other and as a result the machine-learning model 128 can implement decision strategies across the digital images of the object which leads to improved accuracy in making a prediction.

Also, because conventional techniques train a separate machine-learning model for each digital image, these conventional techniques are not based on the image content, itself, but rather solely on the image ID. In contrast, the techniques described herein are usable to train a single machine-learning model 128 that learns image features extracted from the plurality of digital images 122(1)-122(N). This may be performed, for instance, through use of a pre-trained convolutional neural network to extract the image features as the embedding learned by the final layer of the network. This enables the machine-learning model 128 to learn patterns across the digital images which is not possible in conventional techniques.

Further, conventional techniques suffer from a cold start problem. In conventional techniques, when a new digital image is added to support personalization of digital content, it may take weeks until the digital image is ready for accurate personalization. This is because a separate machine-learning model is trained for each digital image and therefore when a new digital image is added, it takes about two weeks in real world implementations to collect enough training data (e.g., "click" data) through exploration techniques for the digital image. This is a significant challenge, even when the new digital image is a minor variation of existing digital images.

In the techniques described herein, however, this problem is addressed in numerous ways. First, by using an embedding layer, the machine-learning model 128 maps image identifiers to a low dimensional vector space. Therefore, when a new digital image is added, a few training examples are sufficient to map this digital image to a vector in the embedding space of the machine-learning model 128. Therefore, patterns learned for digital images mapped to vectors close to the vector for the new digital image can now be used by the machine-learning model 128 to control distribution, e.g., as part of the digital content 114, without waiting the weeks required using conventional techniques. Also, by using image metadata, the machine-learning model 128 can leverage patterns learned from other digital images having similar image metadata, e.g., shapes, colors, and so forth. Further discussion of these and other examples is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Training Data Generation

Figure 2:
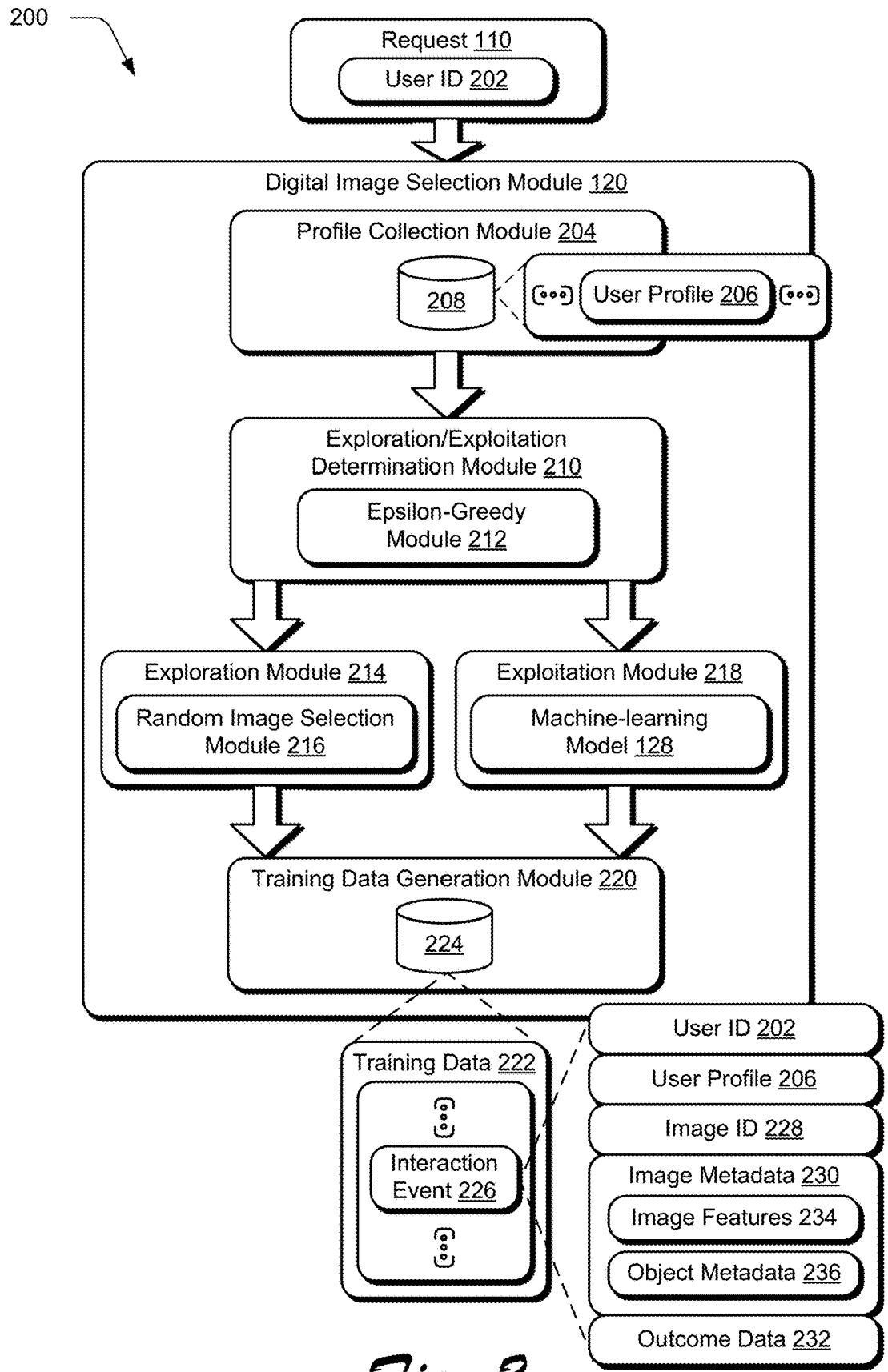
FIG. 2 depicts a system in an example implementation of generating training data to train a machine-learning model.
Figure 3:
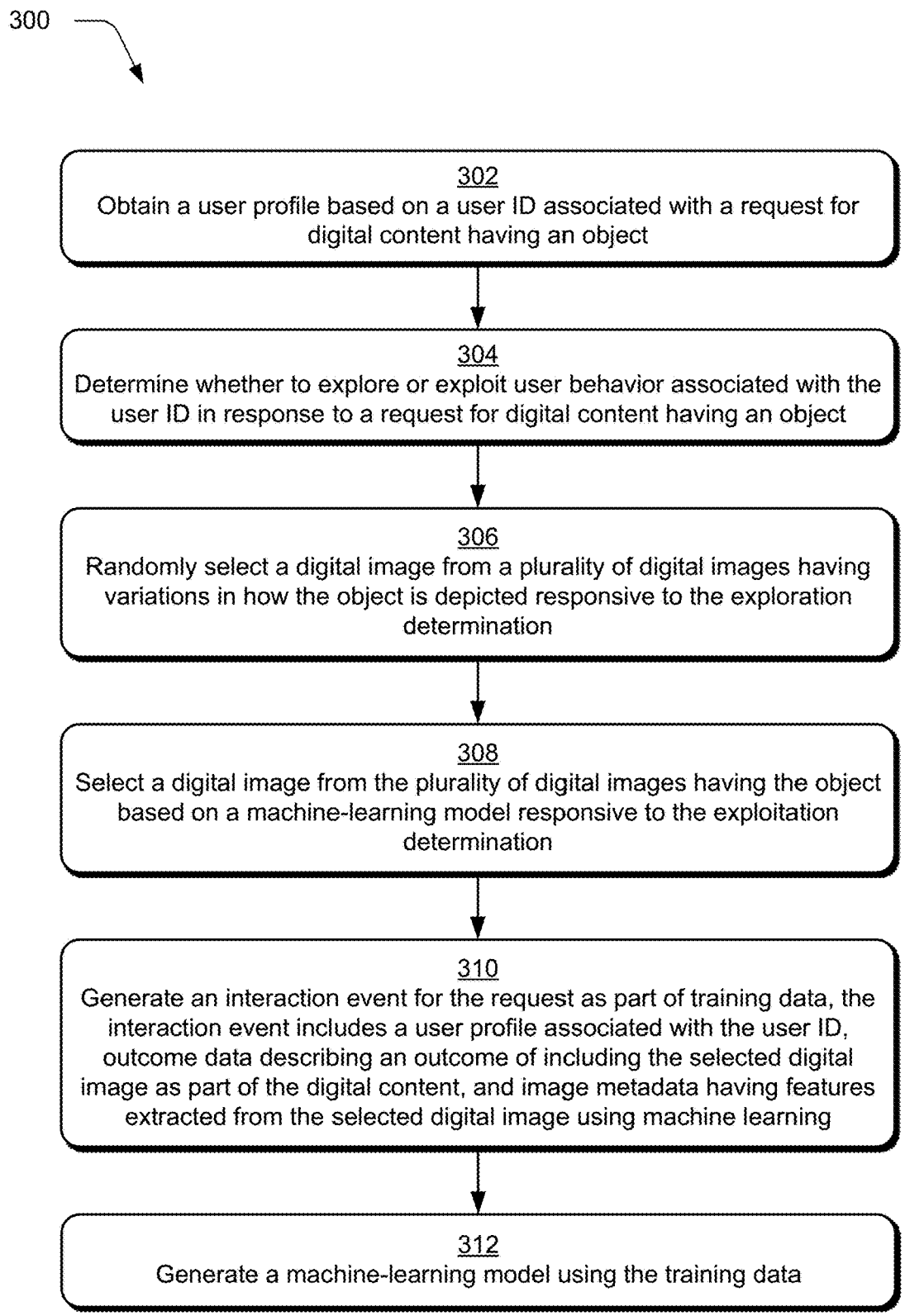
FIG. 3 is a flow diagram depicting a procedure in an example implementation using exploration/exploitation techniques to generate training data and train the machine-learning model to select a digital image from a plurality of digital images of an object is to be used to generate digital content.

FIG. 2 depicts a system 200 in an example implementation of generating training data to train a machine-learning model 128. FIG. 3 depicts a procedure 300 in an example implementation to use exploration/exploitation techniques to generate training data and train the machine-learning model 128 to select a digital image from a plurality of digital images depicting variations of an object is to be used to generate digital content.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

To begin in this example, a request 110 is received by the digital content generation system 112 of FIG. 1 for digital content 114, e.g., a webpage. The communication module 108 is configured as a web browser of the client device 104 to generate the request 110 for a particular webpage. The request 110 includes a user ID 202 associated with a user of the client device 104.

The user ID 202 is then passed as an input to a profile collection module 204 of the digital image selection module 120. The profile collection module 204 is configured to obtain a user profile 206 from a storage device 208 based on the user ID 202 associated with the request 110 for digital content including a digital image of an object (block 302). The storage device 208 may be maintained locally at the service provider system 102 and/or remotely by a third-party system or client device 104. The user profile 206 is configured to describe user interaction with digital images, including which digital images are exposed to a corresponding user ID and an outcome of this exposure, e.g., conversion. The user profile 206 may also describe characteristics of a corresponding user such as demographic data (e.g., age, gender) as well as other information related to the user ID 202, e.g., a corresponding geographic location, IP address, and so forth.

An exploration/exploitation determination module 210 is then utilized to determine whether to explore or exploit user behavior associated with the user ID 202 in response to the request 110 (block 304). A determination to explore the user behavior involves selecting digital images in order to learn more about the user behavior regarding the object depicted in the digital images, e.g., user preferences in how the object is depicted. A determination to exploit the user behavior, on the other hand, is made in order to maximize a likelihood of achieving a desired outcome when exposed to the object via the digital image, e.g., to recommend an item of interest, conversion, and so forth.

In order to make the determination in the illustrated example, an Epsilon-Greedy module 212 is employed by the exploration/exploitation determination module 210. Epsilon, for instance, may be defined as a value between zero and one, e.g., 0.1. This value indicates a percentage of user IDs and associated user behavior that is to be explored and consequently a remaining percentage of user IDs and associated user behavior that is to be exploited. The value of Epsilon may be user specified, specified automatically and without user intervention based on heuristics, and so forth. The tradeoff between exploration and exploitation allows training data to be generated by the digital image selection module 120 that captures new trends in user behavior and thus remains accurate and up to date. Other techniques may also be employed by the exploration/exploitation determination module 210 to make the determination.

Accordingly, responsive to the exploration determination, an exploration module 214 employs a random image selection module 216 to randomly select a digital image from a plurality of digital images having variation in how the object is depicted, one to another (block 306). On the other hand, responsive to an exploitation determination, an exploitation module 218 is used to select the digital image from the plurality of digital images having the variations in how the object is depicted (block 308) using the machine-learning model 128. Further discussion of operation of the machine-learning model 128 to select a digital image of an object is described with respect to FIGS. 6 and 7 in the following discussion.

The selected digital image is included as part of digital content, and a result of user interaction with the digital image is communicated to a training data generation module 220. The selected digital image, for instance, may capture the object as a good for sale as part of a webpage. The outcome, therefore, is whether conversion occurred, which is communicated to a training data generation module 220. Conversion, as previously described, may correspond to a variety of actions, such as whether interaction occurred with the digital image (e.g., a hover or "click"), whether a corresponding product (e.g., the object) or service was added to a shopping cart, whether the corresponding produce or service is purchased, and so forth. Other outcomes are also contemplated in addition to conversion without departing from the spirit and scope of the current subject matter, e.g., launch of a corresponding digital video through selection of the digital image as representing the video.

The training data generation module 220 is then used to generate training data 222 (illustrated as stored in a storage device 224) usable to train the machine-learning model 128. To do so, the training data generation module 220 generates an interaction event 226 as corresponding to the request 110. The interaction event 226 includes the user ID 202, a user profile 206 associated with the user ID 202, an image ID 228 of the selected digital image, image metadata 230, and outcome data 232 describing an outcome of including the selected digital image as part of the digital content (block 310). The outcome data 232, for instance, may describe whether an outcome did or did not occur, such as conversion or other action.

As previously described, the image metadata 230 may include features 234 extracted from the selected digital image using machine learning. This may be stored as part of the training data 222 when generated or later by fetching a digital image corresponding to the image ID 228 and processing the image using feature extraction as described above. The image metadata 230 may also include object metadata 236. The object metadata 236 includes information about the object captured by the digital images, e.g., product category, description, color, size, image tags, and so forth which may be taken from text (e.g., caption, tag, description) associated with a respective digital image or elsewhere. A machine-learning model is then generated using the training data 222 (block 312) as further described in the following section.

Machine-Learning Model Training

Figure 4:
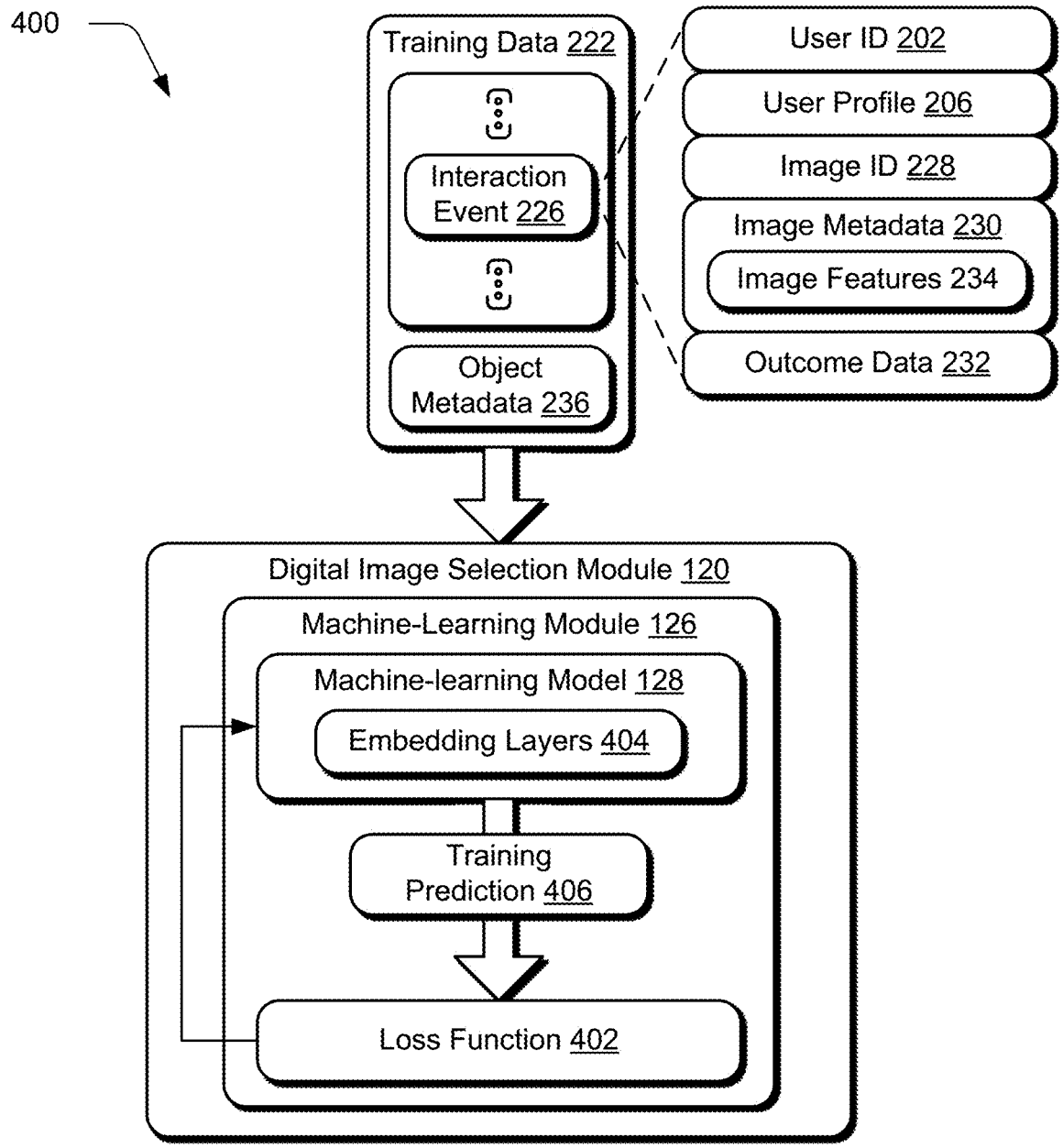
FIG. 4 depicts a system in an example implementation of training a machine-learning model using the training data of FIG. 2.
Figure 5:
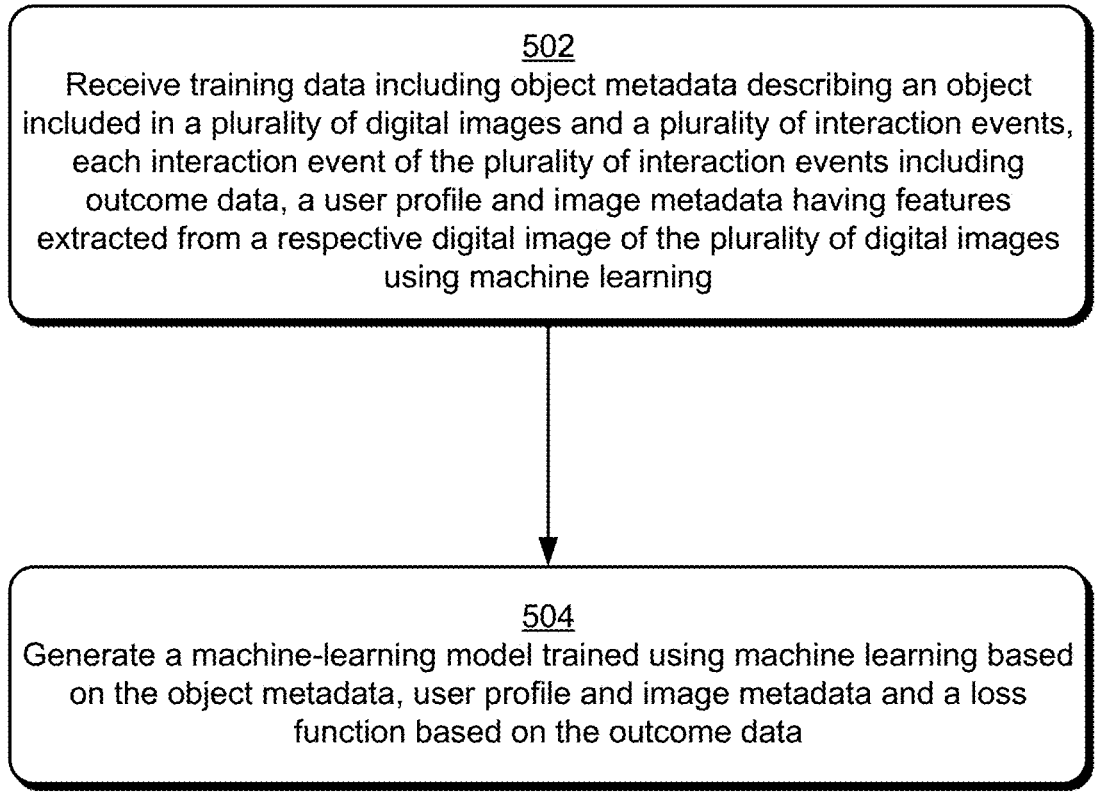
FIG. 5 is a flow diagram depicting a procedure in an example implementation of using training data having interaction events that include a user profile, image metadata including image features extracted from digital images, and outcome data to train the machine-learning model.

FIG. 4 depicts a system 400 in an example implementation of training the machine-learning model 128 using the training data of FIG. 2. FIG. 5 depicts a procedure 500 in an example implementation of using training data having interaction events that include a user profile, image metadata including image features extracted from digital images, and outcome data to train the machine-learning model 128.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 4-5.

This example discussion continues from the previous section and as such begins with receiving the training data 222 by a machine-learning module 126 of the digital image selection module 120. The image metadata 230 may also include object metadata 236. The training data 222 includes object metadata 236 having information about the object captured by the digital images, e.g., product category, description, color, size, image tags, and so forth.

The training data 222 as described in the previous example is collected as a plurality of interaction events 226 based on observed user interaction with digital images of the object. As part of this, each of the interaction events 226 in the training data 222 includes a user profile 206 associated with the user ID 202, image metadata 230 having image features 234 extracted from a respective digital image of the plurality of digital images using machine learning, and outcome data 232 describing an outcome of including the selected digital image as part of the digital content (block 502). The object metadata 236 therefore may be particular to the interaction event 226 (e.g., how the object is capture din the digital images) and/or characteristics general to the plurality of digital images, e.g., a color common across the digital images.

The machine-learning module 126 is then employed to generate a machine-learning model 128 trained based on the object metadata 236, user profile 206, image metadata 230, and a loss function 402 based on the outcome data 232 (block 504). The loss function 402 is a function that maps values of one or more explanatory variables (e.g., features) into a real number representing a cost associated with an event, and in optimization the loss function 402 is minimized in order to train the machine-learning model 128. In classification, for instance, the loss function 402 is a penalty for incorrect classification, e.g., whether the outcome described in the output data 232 did or did not occur.

Accordingly, the object metadata 236, user profile 206 and image features 234 are processed by embedding layers 404 of the machine-learning model 128 to generating a training prediction 406, e.g., for each of the interaction events 226. The training prediction is used as part of the loss function 402 along with the outcome data 232 to backpropagate a result of comparison of the training prediction 406 with the outcome data 232 to set parameter values within the machine-learning model 128 (e.g., neurons and corresponding connections within a neural network) to train the machine-learning model 128.

In this way, the machine-learning model 128 learns an embedding space for different images of an object that may be used to determine similarity of the digital images to each other, thus solving conventional cold start and counterfactual challenges as previously described. This training may be performed to initially generate the machine-learning model 128 as well as generate updated versions of the machine-learning model 128, e.g., to capture changing trends in user behavior to how the object is represented in the digital images. The generated machine-learning model 128 may then be used to select the digital image as further described in the following section.

Digital Image Selection Using the Machine-Learning Model

Figure 6:
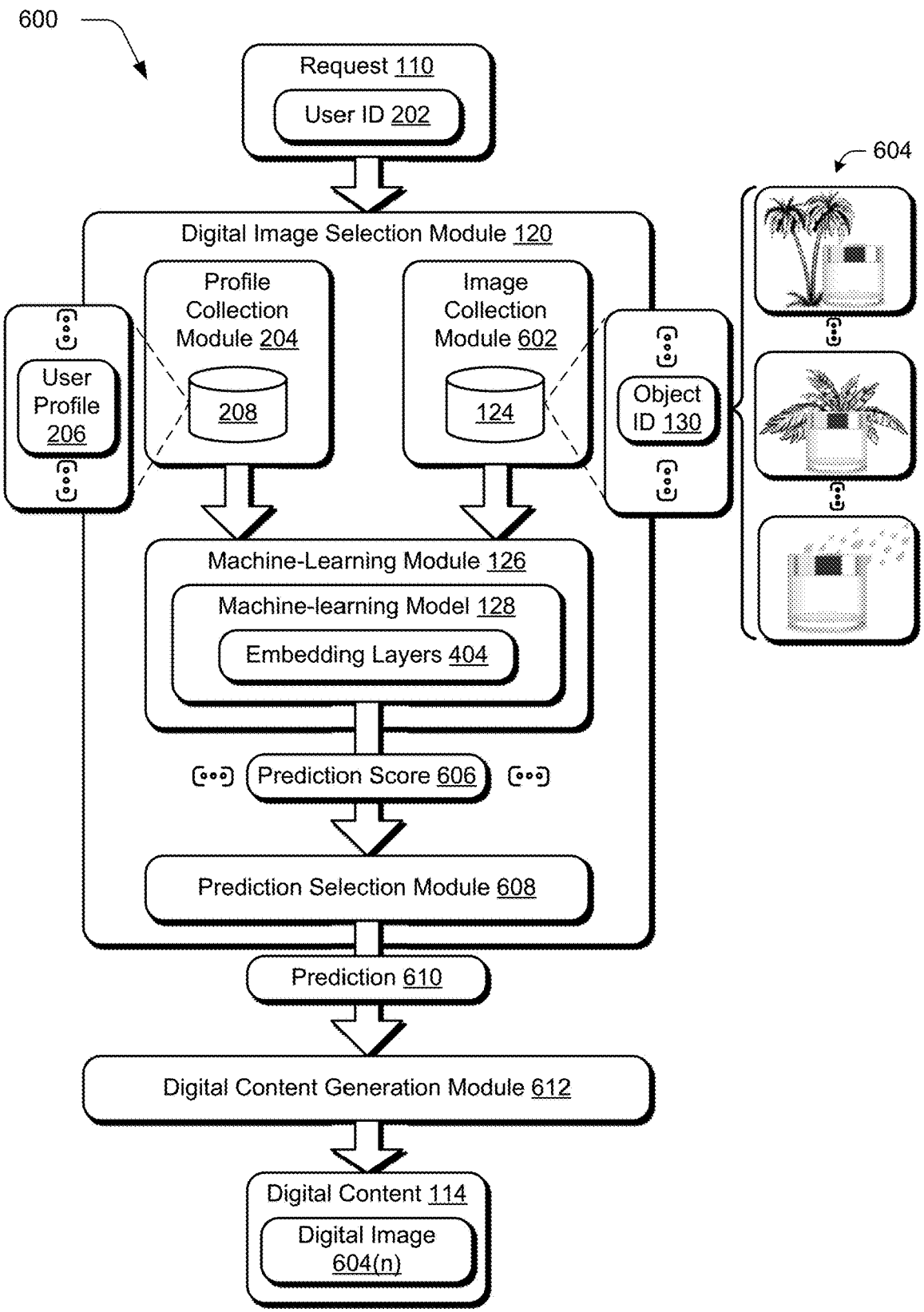
FIG. 6 depicts a system in an example implementation of selecting a digital image from a plurality of digital images of an object using the machine-learning model trained in FIG. 4.
Figure 7:
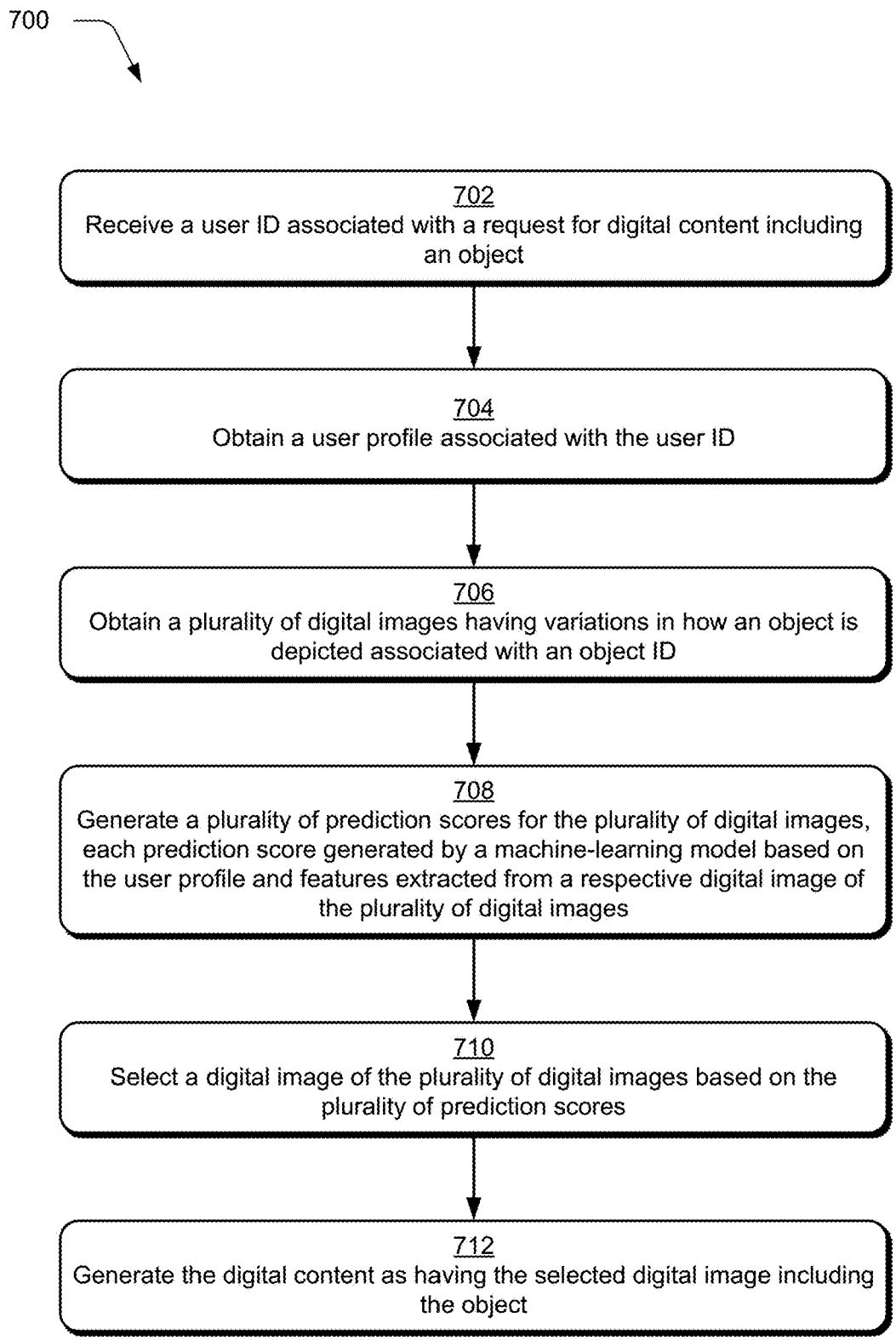
FIG. 7 is a flow diagram depicting a procedure in an example implementation of generating digital content having a digital image selected by a machine-learning model based on a user profile and image metadata.

FIG. 6 depicts a system 600 in an example implementation of selecting a digital image from a plurality of digital images depicting variations of an object using the machine-learning model 128 trained in FIG. 4. FIG. 7 depicts a procedure 700 in an example implementation of generating digital content 114 having a digital image selected by a machine-learning model 128 based on a user profile 206 and image metadata 230.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 4-5.

In this example, digital content 114 is generated using the machine-learning model 128 trained as described in the previous section. To begin, a user ID 202 is received that is associated with a request 110 for digital content 114 including a digital image of an object (block 702). The digital content, for instance, may be configured as a webpage and the digital image is included as part of the webpage. Other examples are also contemplated, such as a thumbnail used to represent a digital video.

In response, a user profile 206 associated with the user ID 202 is obtained (block 704) by a profile collection module 204 from a storage device 208, which may be local to or remove from the service provider system 102. The user profile 206 describes a variety of characteristics associated with the user ID 202. This may include characteristics of an associated user, such as demographic information (e.g., age and gender), characteristics in how access is obtained by the user ID 202 (e.g., type of device, network connection), location, and so forth. The user profile 206 may also describe past user interactions with corresponding digital images, such as an outcome of interaction with the digital images.

A plurality of digital images associated with an object ID 130 is also obtained (block 706) that include variations in how an object is depicted, one to another. An image collection module 602, for instance, may locate the object ID 130 that corresponds to an item of digital content to be generated. Continuing with the previous example, the digital content may be configured as a webpage having a portion to depict an object, such as a product or service for sale in an ecommerce website. The webpage includes an object ID 130, therefore, that is associated with digital images 604 that depict this object. A selection is then made regarding which digital image from the plurality of digital images 604 are to be included in the webpage. In this way, this selection is made based on the object alone in this example and not on the digital content as a whole and as such the prediction is formed with increased accuracy as not being skewed by "what else" is included in the digital content.

To do so, the user profile 206 and digital images 604 are passed to the machine-learning module 126. The machine-learning module 126 is then configured to generate a plurality of prediction scores 606 for the plurality of digital images 604. Each prediction score is generated by the machine-learning model 128 based on the user profile 206 and features extracted from a respective digital image of the plurality of digital images 604 (block 708). The machine-learning model 128, for instance, may include embedding layers 404 to generate image metadata having image features extracted from each of the digital images 604. These image features, along with the user profile, are processed by the machine-learning model 128 using machine learning to generate a prediction score 606 for each of the digital images 604. The prediction score indicates a probability (e.g., between zero and one) that a corresponding outcome will occur based on inclusion of the selected digital image as part of the digital content 114. The prediction scores 606, for instance, may indicate a likelihood of conversion, e.g., as selecting the digital image to launch a corresponding digital video, initiate purchase of a good or service corresponding to the object in the digital image, and so forth.

The prediction scores 606 are then passed by the machine-learning module 126 as an input to a prediction selection module 608. The prediction selection module 608 is configured to select a digital image from the plurality of digital images 604 based on the plurality of prediction scores (block 710). The prediction selection module 608, for instance, may select the digital image having a highest likelihood of achieving the desired outcome (e.g., conversion) based on the prediction scores 606. This prediction 610 is then passed to the digital content generation module 612 to generate the digital content 114 as having the selected digital image 604(*n*) including the object (block 712), e.g., to include the digital image 604(*n*) as part of a webpage.

In this way, the techniques described herein overcome the challenges, limitations, and computational inefficiencies of conventional techniques. This includes addressing the counterfactual problem, cold-start problem (and thus computational resources are available weeks before conventional techniques), and address the image content itself to learn patterns across the digital images which is not possible in conventional techniques.

Example System and Device

Figure 8:
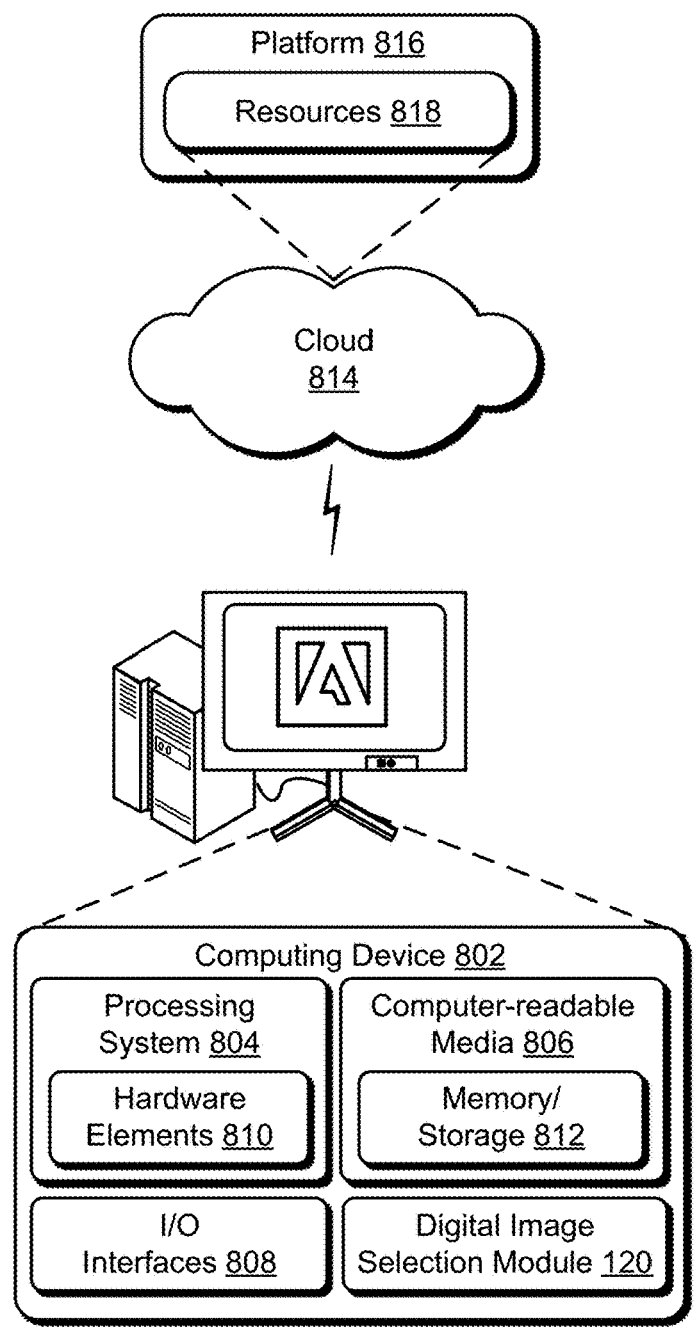
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the digital image selection module 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium digital content generation environment that addresses object variations as part of digital image selection, a method implemented by at least one computing device, the method comprising:
   receiving, by the at least one computing device, a user ID associated with a request for digital content;
   obtaining, by the at least one computing device, a plurality of digital images having variations in how an object is depicted and a user profile associated with the user ID;
   generating, by the at least one computing device, a plurality of prediction scores for the plurality of digital images, each prediction score generated by a machine-learning model based on the user profile and image metadata including features extracted from a respective digital image of the plurality of digital images;
   selecting, by the at least one computing device, a digital image of the plurality of digital images based on the plurality of prediction scores; and
   generating, by the at least one computing device, the digital content as having the selected digital image depicting the object.

2. The method as described in claim 1, wherein the generating includes extracting the features as an embedding from the respective digital image using a convolutional neural network.

3. The method as described in claim 1, wherein the image metadata also describes a characteristic of the object including a product category or object description from text associated with the respective digital image.

4. The method as described in claim 1, the user profile having user information including demographic or location information.

5. The method as described in claim 1, wherein a prediction score of the plurality of prediction scores indicates a probability of achieving an outcome resulting from inclusion of the respective digital image as part of the digital content.

6. The method as described in claim 5, wherein the outcome is conversion.

7. The method as described in claim 1, wherein the digital content is a webpage and the plurality of digital images include respective differences in how the object is depicted.

8. The method as described in claim 7, wherein the object is an item of clothing and the respective differences are human models wearing the item of clothing.

9. The method as described in claim 1, wherein the digital content is a digital video and the selected digital image is configured as a thumbnail that is selectable to launch the digital video.

10. The method as described in claim 1, wherein the machine-learning model is a single convolutional neural network trained using a plurality of training digital images and the plurality of prediction scores are generated from the plurality of digital images using the single convolutional neural network.

11. In a digital medium machine-learning model training environment that addresses object variations as part of digital image selection, a system comprising:

an exploration/exploitation determination module implemented at least partially in hardware of the computing device to make an exploration or exploitation determination to explore or exploit user behavior associated with a user ID in response to a request for digital content;

an exploration module implemented at least partially in hardware of the computing device to randomly select a digital image from a plurality of digital images depicting variations of an object, one to another, responsive to the exploration determination;

an exploitation module implemented at least partially in hardware of the computing device to select a digital image from the plurality of digital images depicting the variations of the object based on a machine-learning model responsive to the exploitation determination;

a training data generation module implemented at least partially in hardware of the computing device to generate an interaction event for each said request as part of training data, the interaction event including a user profile associated with the user ID, outcome data describing an outcome of including the selected digital image as part of the digital content, and image metadata having features extracted from the selected digital image using machine learning; and a machine-learning module implemented at least partially in hardware of the computing device to generate a machine-learning model using the training data.

12. The system as described in claim 11, wherein the features are extracted from the selected digital image using a convolutional neural network.

13. The system as described in claim 11, wherein the training data also describes a characteristic of the object including a product category or object description from text associated with the respective digital image.

14. The system as described in claim 11, further comprising a profile collection module implemented at least partially in hardware of the computing device to obtain the user profile based on the user ID associated with the request for the digital content.

15. The system as described in claim 11, further comprising an image collection module implemented at least partially in hardware of the computing device to obtain the plurality of digital images based on an object ID associated with the digital content.

16. The system as described in claim 11, wherein the exploration/exploitation determination module employs an Epsilon-greedy exploration technique.

* * * * *